Sept. 13, 1932.  S. Q. LEE  1,877,136
PROCESS AND PRODUCT OF REENFORCING BLOATED BUILDING MATERIAL
Filed July 3, 1930
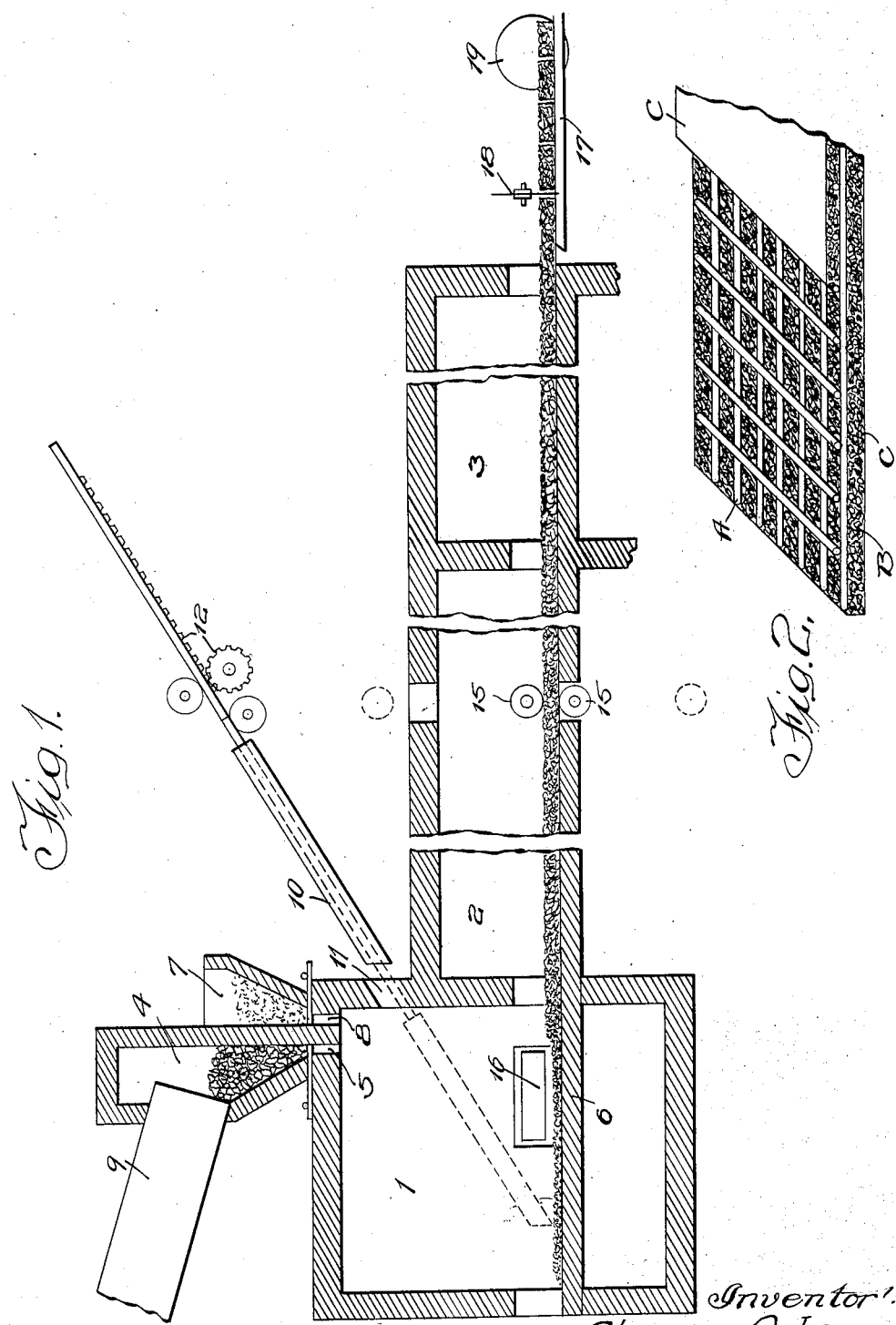

Patented Sept. 13, 1932

1,877,136

UNITED STATES PATENT OFFICE

SHERMAN Q. LEE, OF MADISON, WISCONSIN, ASSIGNOR, BY MESNE ASSIGNMENTS, TO AMERICAN FACE BRICK RESEARCH CORPORATION, A CORPORATION OF ILLINOIS

PROCESS AND PRODUCT OF REENFORCING BLOATED BUILDING MATERIAL

Application filed July 3, 1930. Serial No. 465,512.

This invention relates to process and product of reenforcing bloated building material.

The present invention relates to a process of reenforcing slabs or layers of bloated material by the use of metal rods or mesh introduced into a layer of granular earthy material such as brick clay and embedded therein during the bloating process for reenforcing purposes.

The present invention has particular application to the reenforcing of relatively thin slabs or layers of such bloated material which may be used as shingles, or under conditions where relatively thin slabs are required for panelling or other purposes, although the method involved is applicable to the making of slabs, blocks, columns or the like, of substantial thickness and intended for use under various conditions in which a reenforced cellular product is desired.

The cellular material of the present invention is produced by subjecting a mass, preferably in the form of a uniform layer, to a bloating temperature at which the granular particles of argillaceous or similar earthy material such as ordinary brick clay are fused and coalesced together and are bloated and expanded by the ebullition throughout the mass of gases which serve to form minute non-communicating cells or cavities, giving to the mass as a whole a cellular structure having vitrified cell walls.

Such material possesses high insulating properties and is impermeable to the passage of moisture, and when employed in the form of blocks or bricks does not ordinarily require reenforcement. However, when it is intended to use relatively thin plates or slabs of such material for shingles or the like, it is desirable to reenforce the same by the embedment therein of rods, wires or mesh, to afford the desired strength.

In order to adequately imbed the reenforcing elements within the mass, it is desirable to introduce such elements into a mass or layer of material while in the granular state, so that the fusion and bloating will occur around the reenforcing elements and embed the same by the coalescence of the granular particles while in a fused or semi-fluid state, and the present invention relates to the method of obtaining this result and to the product produced by the employment of the present process.

The process is preferably carried out by first preheating the argillaceous or other earthy particles while in a granular state and under agitation in a preheater up to a temperature slightly below that at which the particles tend to adhere and lose their granular character. Thereafter, the particles are deposited in the form of a sheet or layer upon the floor or hearth of a furnace maintained at a bloating temperature, which under ordinary conditions will be in the neighborhood of 2200° F.

After the layer, or a portion thereof, has been deposited, the rods, wires, mesh, or other reenforcing elements, are laid upon and covered over by the granular material. Thereafter, the reenforced layer is permitted to remain within the bloating zone until the particles become fused together and coalesced into a plastic mass, during which time the ebullition of gases from within the mass will cause bloating thereof and the formation of minute cells throughout the mass. The metallic reenforcing elements thus become completely embedded within the cellular mass.

After the material has become thoroughly bloated, it is discharged from the bloating zone and subjected to an annealing process, which is preferably divided into two stages; first, a soaking stage during which the material is maintained at a temperature below the bloating temperature but slightly above the congealing temperature, at which the material hardens and loses its plastic condition. The soaking temperature may be maintained approximately in the neighborhood of 2000° F. to 2050° F., for a long enough period of time to permit the dissipation of interior stresses, after which the material is moved into a cooling zone and allowed to gradually cool down to room temperature, without, however, subjecting it at any time to a violent transition in temperature which might have the effect of causing shattering. The temperatures given above, as well as the bloating temperature previously given, are appropriate for the treatment of certain clays from central and eastern Illinois, but serve merely as a typical example and by way of illustration only.

The material may be produced in the form of a continuous slab or layer, by adding to each charge after it is bloated a succeeding charge of granular material which is fused to and adhered to the preceding charge so that a continuous slab or layer will be built up, or the bloating may proceed by small accretions of material fed to the end of a continuously advancing column, but in either event the reenforcing elements will be introduced in such a way as to permit the granular material to surround and embed the reenforcing elements by the fusion and coalescence of the particles and the bloating thereof.

In order to more fully illustrate the process and the product, reference may be had to the accompanying drawing, wherein,—

Figure 1 is a longitudinal sectional view of a furnace adapted for the carrying out of the present invention; and Fig. 2 is a section of the reenforced product.

The furnace, as shown, comprises a bloating chamber 1, a soaking chamber 2, and a cooling chamber 3. The granular material is discharged from a hopper 4 through an orifice 5 onto a floor or hearth 6 of the bloating chamber. Sand or other lubricant is discharged from a hopper 7 through an orifice 8 and serves to provide a layer of parting material to prevent adherence of the granular material to the floor of the furnace. The granular material is preheated in a rotary preheater 9 and discharged into the hopper 4. As shown, a charging plate 10 is provided which is adapted to move obliquely into the furnace through an orifice 11 for the purpose of distributing sand or other lubricating material, and thereafter the layer of granular material to be bloated. Suitable mechanisms, such as a rack and pinion 12, are provided for operating the charging plate. After bloating, the material is advanced in any suitable manner, but where a continuous slab or layer of material is being produced, the same can be drawn forward by the action of the draw rolls 15 or other suitable instrumentalities.

If desired, a roller 16 may be provided for levelling down the surface of the bloated material while in the bloating chamber. After the material has passed through the cooling chamber, it is delivered to a table or platform 17 and cut into slabs or sections by suitable knives or cutters 18 and 19.

The reenforcing elements, whether in the form of rods, wires or mesh, are introduced into the bloating chamber in any suitable way, or if desired may be fed continuously thereinto and are laid upon the deposited layer of granular material before the same begins to bloat; or where a more complete embedment is desired, the granular material may be built up in the form of several layers, with the reenforcing elements laid in place intermediate the deposit of the layers of granular material. The particular method of manipulating and introducing the reenforcing elements is immaterial, since the present invention relates to the process or method rather than to any particular form of apparatus designed for carrying out the steps of the process.

The material is deposited by downwardly moving the charging plate and first depositing and spreading a layer of sand delivered from the hopper 7 in order to prevent adhesion to the floor of the furnace, after which one or more layers of granular material are spread and leveled down to the desired thickness with the reenforcing elements buried or embedded within the deposited layer or layers of granular material. Thereafter, the material is permitted to bloat for the desired length of time and until the granular particles become thoroughly coalesced, fused and expanded by the formation of a cellular body having vitrified cell walls. This bloating operation completely and permanently embeds the reenforcing elements, since the fusion and coalescence takes place around and through such elements, the heat, however, not being sufficient to cause fusion or excessive oxidation of the metal during the period of time required for the bloating.

Where the material is deposited in successive layers which are fused together to produce a continuous layer, and where reenforcing rods, wires or mesh are incorporated into the slab, it will ordinarily be possible to draw the material forward exclusively by the action of the draw rollers 15, although where desired, additional means or manipulation may be employed for advancing the material.

Numerous modifications in the technique to be observed and in mechanisms to be employed may be introduced without departing from the spirit of the invention.

In Fig. 2, the reenforcement is shown in the form of a wire mesh A which is incorporated within a slab B of bloated material. If the surfaces of the slab are not cut or abraded, they will have formed thereon a continuous surface skin C, while the interior of the mass or slab will present a cellular texture with a reenforcing mesh completely embedded therein.

Although the present invention has been described with considerable particularity, the details relating to the bloating, soaking and cooling of the slab are described only in so far as is necessary to gain a full understanding of the present invention, since these details form the subject matter of other co-pending applications.

By reenforcing a thin slab of bloated material in the manner set forth in the present invention, adequate strength and rigidity may be imparted to permit such slabs to be made sufficiently thin to serve the purpose of a roofing material for use as a substitute for slate, tile, or other roofing materials. At the same time, the slab may be used in relatively large sections where a thin strong panelling or the like is desired, having high insulating and moisture proof properties. Obviously, slabs or blocks of greater thickness may be used for posts, columns, studdings, or for other building purposes, and the length of time devoted to the bloating, soaking and cooling operations will be determined largely by the thickness of the slab and by the composition of the materials employed, it being understood, however, that the periods of time and the temperatures employed should in all cases be regulated to produce a thoroughly bloated slab free from cracks, fissures, or other imperfections.

I claim:

1. The process of producing a reenforced cellular product which consists in embedding and covering over a metallic reenforcing element in a mass of granular earthy material, bloating the granular material to form an expanded cellular product surrounding the reenforcing element, and cooling the product.

2. The process of producing a reenforced cellular product which consists in embedding and covering over a metallic reenforcing element in a mass of granular earthy material, bloating the granular material to form an expanded cellular product surrounding the reenforcing element, and tempering and ultimately cooling the product.

3. The process of producing a reenforced cellular product which consists in embedding and covering over a metallic reenforcing element in an evenly disposed layer of granular earthy material, bloating the granular material to form an expanded cellular layer surrounding the reenforcing element, and annealing and ultimately cooling the layer.

4. The process of producing a reenforced cellular product which consists in subjecting granular particles of earthy material to a preheating temperature under agitation, depositing a mass of such preheated granular particles, and embedding and covering over a metallic reenforcing element in the granular mass, and subjecting the granular mass to a bloating temperature to cause the formation of a unified cellular mass surrounding and protecting the reenforcing element, and in annealing and ultimately cooling the mass.

5. The process of producing a reenforced cellular product which consists in applying and covering over a metallic reenforcing element to a mass of granular earthy material, and subjecting said mass with the reenforcing element applied thereto to a bloating temperature to produce an expanded cellular mass surrounding the reenforcing element, and in annealing and ultimately cooling the mass.

6. The process of producing a reenforced cellular product which consists in preheating granular particles of earthy material to a temperature slightly below that at which fusion begins, depositing granular particles in layer form and embedding and covering over a metallic reenforcing element within said layer, and subjecting the deposited layer with the embedded reenforcing element to a bloating temperature to cause coalescence of the particles throughout the mass and around and over the embedded reenforcing element, and the formation of a cellular layer, subjecting the bloated layer to a soaking temperature intermediate the bloating temperature and the congealing temperature, and in gradually cooling the layer.

7. As a new article of manufacture, a reenforced cellular product consistsing of a mass of earthy material having a cellular structure with vitrified cell walls, and having a metallic reenforcing element embedded and protected within the mass, said material and reenforcing element being unified by fusion of said material.

8. As a new article of manufacture, a reenforced cellular product in the form of a thin slab of earthy material having a cellular structure with vitrified cell walls, and having a metallic reenforcing element embedded within the slab and surrounded thereby, and said material and reenforcing element being unified by fusion of said material.

9. As a new article of manufacture, a reenforced cellular product in the form of a thin slab of earthy material having a cellular structure with vitrified cell walls, and having a reenforcing metallic element in the form of a wire mesh embedded within the interior of the slab and protected thereby, and said material and reenforcing element being unified by fusion of said material.

In witness that I claim the foregoing I have hereunto subscribed my name this 27th day of June, 1930.

SHERMAN Q. LEE.